(12) United States Patent
Sweeney et al.

(10) Patent No.: US 11,976,844 B2
(45) Date of Patent: May 7, 2024

(54) SHAPE OF AN EVAPORATIVE COOLING UNIT

(71) Applicant: Tyco Fire & Security GmbH, Neuhausen am Rheinfall (CH)

(72) Inventors: Michael J. Sweeney, Seattle, WA (US); Nicholas Labonte, Edmonton (CA); Andrew Kim Liang Chan, Edmonton (CA)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 18/071,327

(22) Filed: Nov. 29, 2022

(65) Prior Publication Data

US 2023/0167988 A1 Jun. 1, 2023

Related U.S. Application Data

(60) Provisional application No. 63/284,452, filed on Nov. 30, 2021.

(51) Int. Cl.
*F24F 5/00* (2006.01)
(52) U.S. Cl.
CPC .................................. *F24F 5/0035* (2013.01)
(58) Field of Classification Search
CPC .. F24F 5/0035; F28C 1/02; F28C 1/14; F28C 1/16
See application file for complete search history.

(56) References Cited

U.S. PATENT DOCUMENTS

| | | | |
|---|---|---|---|
| 3,791,102 A | 2/1974 | Huntington | |
| 4,940,475 A | 7/1990 | Yaeger | |
| 5,202,023 A | 4/1993 | Trimmer et al. | |
| 5,217,788 A * | 6/1993 | Rye | F28F 25/087 428/184 |
| 5,309,726 A | 5/1994 | Asbridge | |
| 5,946,931 A | 9/1999 | Lomax et al. | |
| 9,541,302 B2 | 1/2017 | Taylor et al. | |
| 2008/0018001 A1 | 1/2008 | Kammerzell et al. | |
| 2012/0304862 A1 | 12/2012 | Taylor et al. | |
| 2013/0213076 A1 | 8/2013 | Gerlach | |

(Continued)

FOREIGN PATENT DOCUMENTS

| | | |
|---|---|---|
| CN | 210861522 U | 6/2020 |
| DE | 102008006793 A1 | 8/2009 |

(Continued)

OTHER PUBLICATIONS

International Search Report and Written Opinion for PCT Application No. PCT/IB2022/051179, dated Jul. 4, 2022, 18 pages.

(Continued)

*Primary Examiner* — Tavia Sullens
(74) *Attorney, Agent, or Firm* — Fletcher Yoder, PC

(57) ABSTRACT

An evaporative cooling unit includes a first V-shaped portion of a winding of microporous hollow fibers configured to receive a liquid. The evaporative cooling unit also includes a second V-shaped portion of the winding of microporous hollow fibers configured to receive the liquid, where the second V-shaped portion is coupled with the first V-shaped portion. The evaporative cooling unit also includes an internal cavity disposed between the first V-shaped portion and the second V-shaped portion.

15 Claims, 6 Drawing Sheets

(56) References Cited

U.S. PATENT DOCUMENTS

| | | |
|---|---|---|
| 2013/0269924 A1 | 10/2013 | Bugler et al. |
| 2013/0320573 A1 | 12/2013 | Fisher et al. |
| 2015/0069643 A1 | 3/2015 | Mockry et al. |
| 2017/0321913 A1 | 11/2017 | Dinnage et al. |
| 2018/0372387 A1 | 12/2018 | Echols |
| 2020/0208887 A1 | 7/2020 | Mohammad et al. |
| 2020/0284480 A1 | 9/2020 | Tolouei Asbforoushani et al. |

FOREIGN PATENT DOCUMENTS

| | | | |
|---|---|---|---|
| DE | 102015005099 A1 | 3/2016 | |
| JP | H1011097 A | 1/1998 | |
| JP | 2015129373 A * | 7/2015 | |
| KR | 20200016444 A | 2/2020 | |
| WO | 2004028671 A1 | 4/2004 | |
| WO | WO-2021072448 A1 * | 4/2021 | ........... B01D 53/228 |

OTHER PUBLICATIONS

International Search Report and Written Opinion for PCT Application No. PCT/US2022/051395, dated Mar. 13, 2023, 13 pages.
International Search Report and Written Opinion for PCT Application No. PCT/US2022/051406, dated May 17, 2023, 18 pages.

* cited by examiner

SHAPE OF AN EVAPORATIVE COOLING UNIT

CROSS-REFERENCE TO RELATED APPLICATIONS

This application claims priority from and the benefit of U.S. Provisional Application Ser. No. 63/284,452, entitled "SHAPE OF AN EVAPORATIVE COOLING UNIT," filed Nov. 30, 2021, which is hereby incorporated by reference in its entirety for all purposes.

BACKGROUND OF THE DISCLOSURE

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

HVAC equipment and independent cooling devices, such as air handling units, localized air coolers, fan walls, and building systems, face many design constraints during their development. The air supplied through such equipment needs to match stringent design specifications, the footprint must be minimized to save space on-site, and the overall energy consumption should be optimized. As a result, designers must carefully select any components internal to the equipment so as to meet these and other constraints.

Accordingly, there has been an increased utilization of evaporative cooling technology in recent years due to its lower energy consumption compared to other cooling methods. Evaporative coolers lower the temperature of an airstream through the introduction and subsequent evaporation of water particles. These components prove especially useful when the inlet air conditions are dry and warm. Traditional evaporative coolers generally consist of evaporative media, an assembly to hold the media in place, a supply water reservoir, and a water distribution system. Water is piped from the reservoir to the top of the evaporative media; as water gravity drains downward, some water is absorbed into the evaporative media, and the rest falls back into the supply water reservoir. When air passes through this wetted media, water evaporates into the airstream, and it is this process which adiabatically cools the air.

Traditional evaporative coolers have several drawbacks. For example, traditional evaporative coolers are susceptible to water carryover. Water carryover is a process in which air passing through the evaporative media pulls excess water droplets out into the air, resulting in the unintentional accumulation of water in the downstream area. At high air velocities, this process becomes more pronounced. Further, the evaporative media of traditional evaporative coolers may be oriented generally perpendicular to an air flow passing over the evaporative media, such that pressure and velocity profiles across the media are substantially uniform. While this orientation may reduce water carryover, it increases a size of the traditional evaporative cooler. The relatively large size of traditional evaporative coolers may be compounded by the inclusion of a containment device below the evaporative media that collects water as it is gravity-fed downwardly, and by the use of a mist eliminator downstream of the evaporative media and configured to absorb water carried through the air. The mist eliminator also generates a pressure drop that causes an increase in power requirements and corresponding decrease in overall efficiency of the traditional evaporative cooler.

Further, traditional evaporative coolers may require the use of relatively clean water to reduce mineral deposits, commonly known as "scale" build-up. The susceptibility of traditional evaporative coolers to mineral deposits may require time consuming maintenance techniques and/or excessive water replacement. Further, traditional evaporative coolers are limited in their ability to precisely control the supply air temperature and humidity. In general, the exiting air can be controlled by turning the traditional evaporative cooler ON or OFF depending on the temperature or humidity requirements. That is, delivery of water to the evaporative media may be enabled when the traditional evaporative cooler is ON and disabled when the evaporative cooler is OFF. However, the evaporative media may remain wet for a time period after the traditional evaporative cooler is switched to OFF, causing additional cooling and humidification to occur, which contributes to control latency of the traditional evaporative cooler. Once the media is wet, the amount of water that evaporates into the airstream is completely dependent on the incoming air conditions.

Further still to the points above, a shape of traditional evaporative cooling units, which may be constrained based on the above-described limitations (e.g., water carryover, cooler unit orientation, scale build-up, etc.), may increase a footprint and reduce an efficiency of the corresponding system. For the foregoing reasons, among others, it is now recognized that improved evaporative cooling systems and methods are desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, an evaporative cooling unit includes a first V-shaped portion of a winding of microporous hollow fibers configured to receive a liquid. The evaporative cooling unit also includes a second V-shaped portion of the winding of microporous hollow fibers configured to receive the liquid, where the second V-shaped portion is coupled with the first V-shaped portion. The evaporative cooling unit also includes an internal cavity disposed between the first V-shaped portion and the second V-shaped portion.

In another embodiment, an evaporative cooling unit includes microporous hollow fibers, where each microporous hollow fiber includes one or more walls, a liquid flow path defined by the one or more walls and configured to receive a liquid, and pores extending through the one or more walls. The pores are configured to block passage of the liquid therethrough and enable passage of a vapor formed from the liquid therethrough. The evaporative cooling unit also includes a sheet having the microporous hollow fibers contained therein, where the sheet is arranged to form a closed-loop shape comprising a rhombus or rhomboid.

In another embodiment, an evaporative cooling unit includes a winding of microporous hollow fibers forming a closed-loop shape having a leading edge, a trailing edge configured to be disposed downstream of the leading edge relative to an air flow, and an internal cavity disposed between the leading edge and the trailing edge.

BRIEF DESCRIPTION OF THE DRAWINGS

Various aspects of this disclosure may be better understood upon reading the following detailed description and upon reference to the drawings in which.

DETAILED DESCRIPTION

Figure 1:
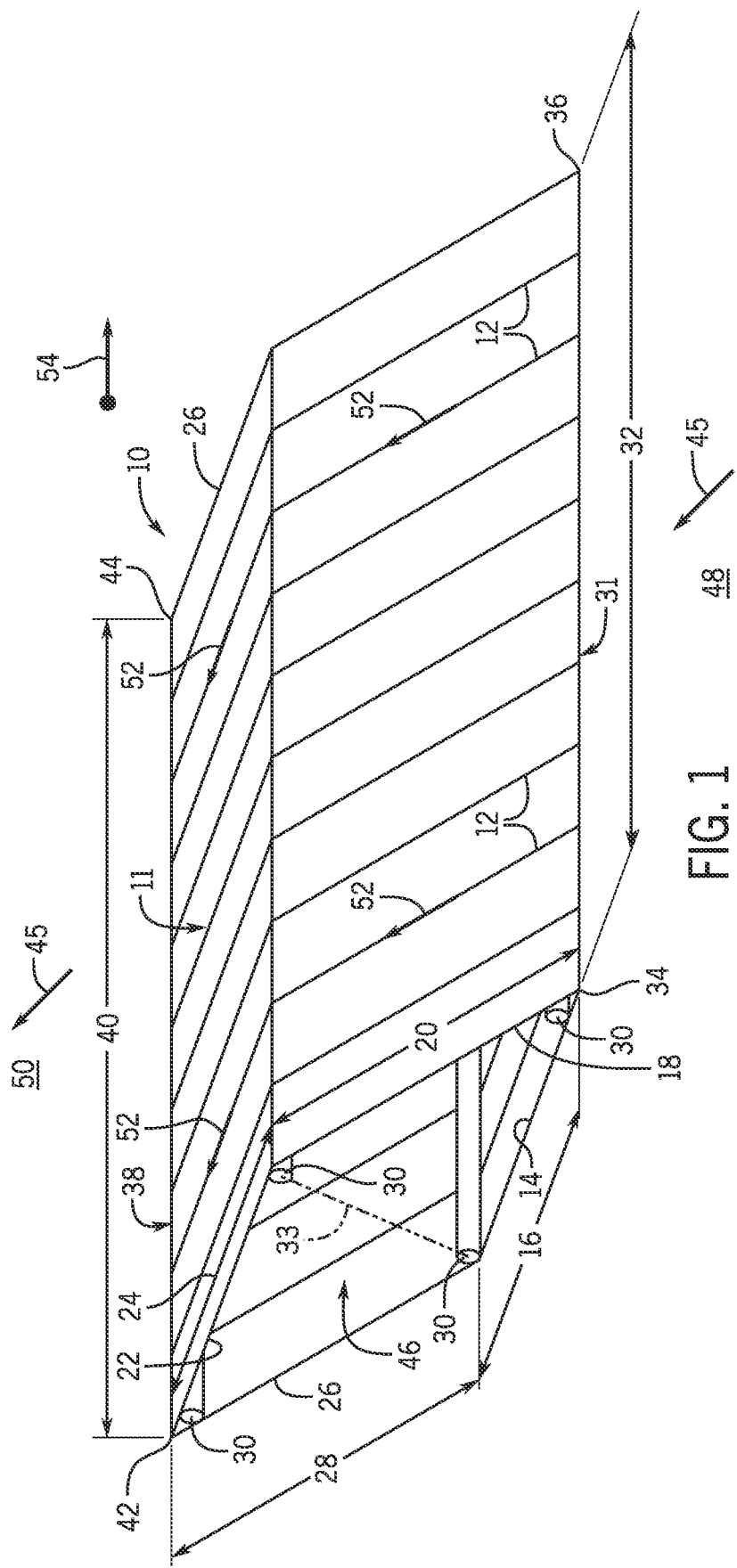
FIG. 1 is a schematic perspective view of an evaporative cooling unit including microporous hollow fibers wound in a generally closed-loop shape (e.g., a rhombus), in accordance with an aspect of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates to evaporative cooling units for use in HVAC equipment or as an independent cooling and/or humidifying apparatus. In particular, this disclosure relates to an evaporative cooling unit including microporous hollow fibers wound in a generally closed-loop shape (e.g., a rhombus shape) having a leading edge, a trailing edge, and an internal cavity between the leading edge and the trailing edge.

The utilization of evaporative cooling technology has increased in recent years due to its lower energy consumption compared to other cooling methods. Evaporative coolers lower the temperature of an airstream through the introduction and subsequent evaporation of water particles. These components prove especially useful when the inlet air conditions are dry and warm.

Membrane-contactor panels composed of a plurality of microporous hollow fibers are known in the art (for example, 3M® media utilizing CELGARD® microporous hollow fibers). Water or some other liquid is guided through the plurality of microporous hollow fibers, and an ambient gas stream (e.g., air) is passed over the plurality of microporous hollow fibers. Walls of the microporous hollow fibers are permeable only to water in the vapor form; liquid water cannot exit the walls of the microporous hollow fibers to directly mix with the ambient gas stream. As water vapor exits the walls of the microporous hollow fibers via pores in the walls, it comes into direct contact with the ambient gas stream resulting in a transfer of mass and energy. This contrasts with traditional evaporative media whereby the liquid water wetting the media's surface evaporates directly into the ambient gas stream.

In accordance with the present disclosure, an evaporative cooling unit includes microporous hollow fibers wound in a closed-loop shape having a leading edge, a trailing edge, and an internal cavity between the leading edge and the trailing edge. For example, the microporous hollow fibers may be embedded or otherwise contained in a sheet (e.g., a flexible sheet, such as a woven fabric sheet) that is wound about various anchors (e.g., rods, frame members, poles) of the evaporative cooling unit to form the closed-loop shape. In some embodiments, the sheet having the microporous hollow fibers is wound about the various anchors several times, such that the closed-loop shape includes multiple layers of the microporous hollow fiber. In accordance with the present disclosure, the closed-loop shape may be a rhombus or a rhomboid. A rhombus is a quadrilateral whose four sides have equal lengths. A rhomboid is a parallelogram having adjacent sides of dissimilar lengths and non-right angles between adjacent sides. However, it should be understood that the closed-loop shape may not form a perfect geometric rhombus or rhomboid. Indeed, one of ordinary skill in the art would recognize that the closed-loop shape may deviate from a perfect geometric rhombus or rhomboid (e.g., due to engineering tolerances), but that the closed-loop shape would still be considered a rhombus or rhomboid by one of ordinary skill in the art.

Further, it should be understood that "the closed-loop shape," in accordance with the present disclosure, may be partially completed by a component of the evaporative cooling unit other than the sheet of microporous hollow fibers. For example, the sheet of microporous hollow fibers may be attached to a first anchor of the above-described anchors of the evaporative cooling unit, and wound about additional anchors (e.g., second, third, and fourth anchors) of the evaporative cooling and back to the first anchor. The first anchor may form a portion of the closed-loop shape. Stated differently, the anchors of the evaporative cooling unit may define the closed-loop shape about which the sheet of microporous hollow fibers is wound, such that the sheet of microporous hollow fibers forms the closed-loop shape after being wound about the anchors. As previously described, in some embodiments, the sheet of microporous hollow fibers may be wound about the anchors of the evaporative cooling unit multiple times, creating layers of the microporous hollow fibers about the closed-loop shape. These and other features will be described in detail with reference to the drawings.

In operation of the evaporative cooling unit, a liquid (e.g., liquid water) is routed through the above-described microporous hollow fibers. An air flow is directed from an upstream area external to the closed-loop shape, through the leading edge defined by the closed-loop shape, into the internal cavity between the leading edge and the trailing edge of the closed-loop shape, through the trailing edge defined by the closed-loop shape, and into a downstream area external to the closed-loop shape. As the air flow passes through the leading edge and the trailing edge, the air flow may pass between various adjacent microporous hollow fibers. Further, as the air flow passes through the leading edge, into the internal cavity, and through the trailing edge, water vapor may exit pores in the walls of the microporous hollow fibers and into the air flow, resulting in a transfer of mass and energy. Thus, the air flow is cooled and humidified by the evaporative cooling unit for delivery to a conditioned space.

The above-described configuration of the evaporative cooling unit may provide several technical benefits over traditional embodiments. For example, the closed-loop (e.g., rhombus) shape formed by the winding of microporous hollow fibers may provide a higher density of evaporative cooling media than traditional embodiments. Indeed, in certain traditional embodiments, evaporative cooling media may be oriented such that a face of the evaporative cooling media is oriented perpendicular to the direction of air flow thereover, as orienting the traditional evaporative cooling media at an oblique angle relative to the direction of air flow may cause undesirable water carryover into the air flow. The microporous hollow fibers of the disclosed evaporative cooling unit are not susceptible to water carryover and, thus, can be oriented at oblique angles relative to the direction of air flow without water carryover. The presently disclosed closed-loop (e.g., rhombus) shape of the winding of microporous hollow fibers may generally leverage the above-described technical effects to increase a density of evaporative cooling media and increase an amount of cooling, increase an efficiency of the system, and reduce a footprint of the system. These and other features are outlined in detail below.

FIG. 1 is a schematic perspective view of an embodiment of an evaporative cooling unit 10 including a winding 11 (or sheet) of microporous hollow fibers 12 forming a closed-loop shape, such as a rhombus. The winding 11 of microporous hollow fibers 12 may include a flexible sheet of microporous hollow fibers 12 that is wound about various anchors 30 (e.g., rods, frame members, poles) of the evaporative cooling unit 10 to form the closed-loop shape. A frame (not shown) may connect the anchors 30 such that the anchors 30 are held in place.

In the illustrated embodiment, the closed-loop shape includes a first side 14 of the winding 11 of microporous hollow fibers 12 (e.g., having a first length 16), a second side 18 of the winding 11 of microporous hollow fibers 12 (e.g., having a second length 20), a third side 22 of the winding 11 of microporous hollow fibers 12 (e.g., having a third length 24), and a fourth side 26 of the winding 11 of microporous hollow fibers 12 (e.g., having a fourth length 28). The first length 16, the second length 20, the third length 24, and the fourth length 28 are substantially equal (e.g., within engineering tolerances). Accordingly, the closed-loop shape formed by the winding 11 of microporous hollow fibers 12 in FIG. 1 is a rhombus. However, another embodiment of the evaporative cooling unit 10 may include the winding 11 of microporous hollow fibers 12 forming a different closed-loop shape, such as a rhomboid. Further, in the illustrated embodiment, the first side 14 and the second side 18 may form a first V-shaped portion of the winding 11, the third side 22 and the fourth side 26 may form a second V-shaped portion of the winding 11, and the first V-shaped portion may be coupled to the second V-shaped portion to form the closed-loop shape (e.g., rhombus, rhomboid). Each microporous hollow fiber 12 in the illustrated embodiment includes a fluid flow path that extends across the first side 14, the second side 18, the third side 22, and the fourth side 26 of the closed-loop shape. Further, the winding 11 of microporous hollow fibers 12 may be wound about the anchors 30 multiple times such that multiple layers of the microporous hollow fibers 12 exist on each side 14, 18, 22, 26 of the closed-loop shape.

In FIG. 1, a leading edge 31 of the evaporative cooling unit 10 is defined by the first side 14 and the second side 18 of the closed-loop shape. The leading edge 31 includes a width 32 extending perpendicular to the first length 16 of the first side 14 and the second length 20 of the second side 18. The width 32 of the leading edge 31 is defined between an end juncture 34 of the first side 14 and the second side 18 and an additional end juncture 36 of the first side 14 and the second side 18. Further, a trailing edge 38 of the evaporative cooling unit 10 is defined by the third side 22 and the fourth side 26 of the closed-loop shape. The trailing edge 38 includes a width 40 extending perpendicular to the third length 24 of the third side 22 and the fourth length 28 of the fourth side 26. The width 40 of the trailing edge 38 is defined by an end juncture 42 of the third side 22 and the fourth side 26 and an additional end juncture 44 of the third side 22 and the fourth side 26. The width 40 of the trailing edge 38 and the width 32 of the leading edge 31 may be substantially equal (e.g., within engineering tolerances).

It should be noted that the leading edge 31 may include an entirety of the first side 14 and the second side 18 of the closed-loop shape, and that the trailing edge 38 may include an entirety of the third side 22 and the fourth side 26 of the closed-loop shape. In the illustrated embodiment, the leading edge 31 forms a first arrow shape (or V-shape), the trailing edge 38 forms a second arrow shape (or V-shape), and the first arrow shape and the second arrow shape may together form the closed-loop shape. The first arrow shape of the leading edge 31 and the second arrow shape of the trailing edge 38 may be symmetrical across an axis 33 therebetween.

The leading edge 31 is referred to as "leading" and the trailing edge 38 is referred to as "trailing" with respect to an air flow 45 directed toward and through the evaporative cooling unit 10. For example, the evaporative cooling unit 10 includes an internal cavity 46 bound by the closed-loop shape of the winding 11 of microporous hollow fibers 12. That is, the internal cavity 46 is defined by the first side 14, the second side 18, the third side 22, and the fourth side 26 of the closed-loop shape. In other words, the internal cavity 46 is disposed between the leading edge 31 and the trailing edge 38. In general, the internal cavity 46 is devoid of the microporous hollow fibers 12. The air flow 45 is directed from an upstream space 48, toward the leading edge 31, through the leading edge 31 (e.g., through the first side 14 and the second side 18 of the closed-loop shape), into the internal cavity 46, through the trailing edge 38 (e.g., through the third side 22 and the fourth side 26 of the closed-loop shape), into a downstream space 50, and away from the trailing edge 38. The air flow 45 is generally passed over the microporous hollow fibers 12, such as through spaces between the microporous hollow fibers 12. In some embodiments, the winding 11 of the microporous hollow fibers 12 includes a sheet (e.g., a flexible sheet, such as one formed by a woven fabric material) that permits the air flow 45 to pass through the winding 11 (e.g., through spaces between the microporous hollow fibers 12).

Figure 2:
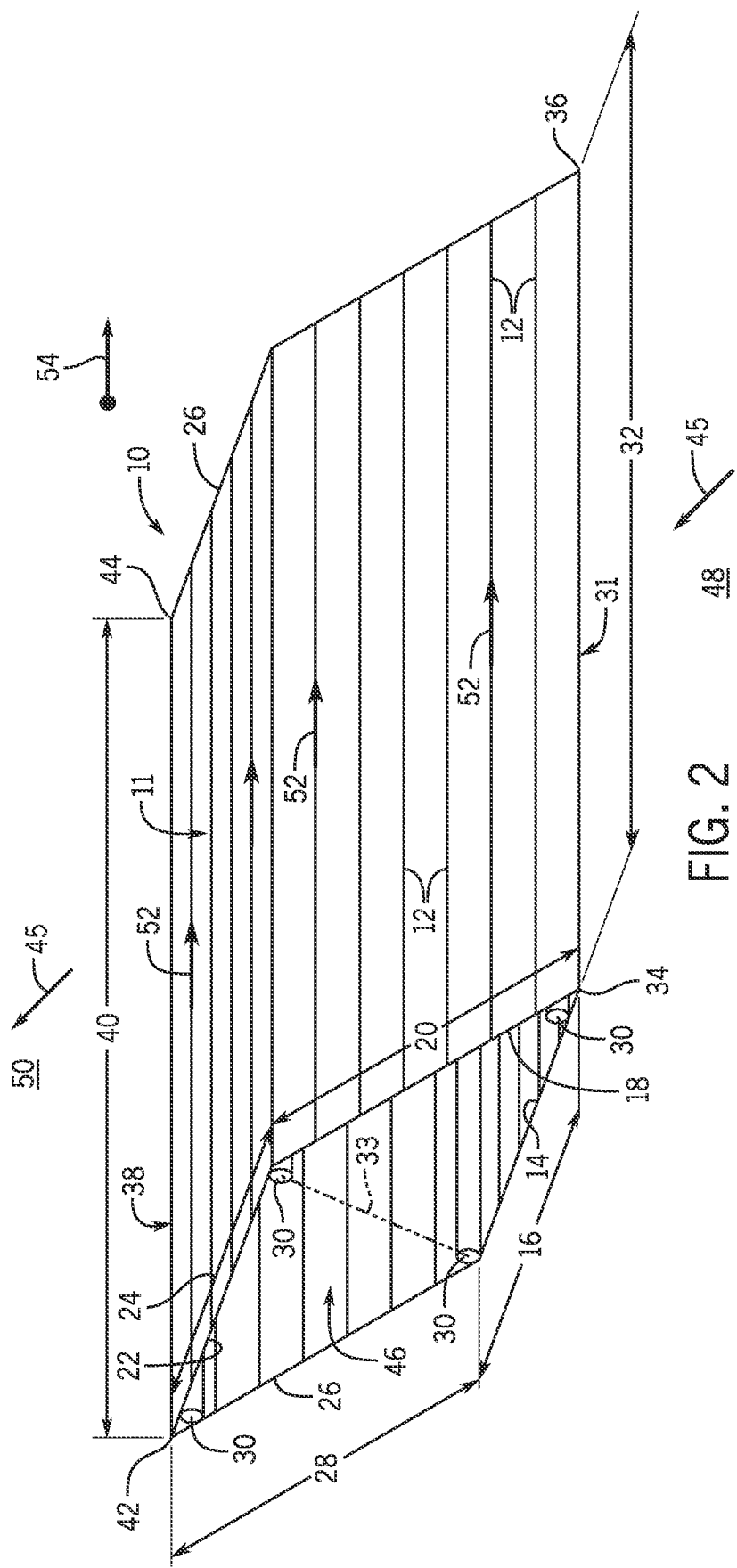
FIG. 2 is a schematic perspective view of another evaporative cooling unit including microporous hollow fibers wound in a generally closed-loop shape (e.g., a rhombus), in accordance with an aspect of the present disclosure.

A liquid 52 (e.g., liquid water) is passed through the microporous hollow fibers 12. For example, in the illustrated embodiment, the microporous hollow fibers 12 are oriented such that the liquid 52 is passed through the microporous hollow fibers 12 along the first length 16 of the first side 14, the second length 20 of the second side 18, the third length 24 of the third side 22, and the fourth length 28 of the fourth side 26. However, in another embodiment of the evaporative cooling unit 10 illustrated in FIG. 2, the microporous hollow fibers 12 are oriented such that the liquid 52 is passed through the microporous hollow fibers 12 in a direction 54 perpendicular to the first length 16 of the first side 14, the second length 20 of the second side 18, the third length 24 of the third side 22, and the fourth length 28 of the fourth side 26. That is, the direction 54 in which the liquid 52 is routed through the microporous hollow fibers 12 in FIG. 2 is substantially parallel with the width 32 of the leading edge 31 of the evaporative cooling unit 10 and the width 40 of the trailing edge 38 of the evaporative cooling unit 10. In both of FIGS. 1 and 2, one of the anchors 30 (e.g., rods, frame members, poles) of the evaporative cooling unit 10 may act as an inlet to the microporous hollow fibers 12, and one of the anchors 30 (e.g., rods, frame members, poles) of the evaporative cooling unit 10 may act as an outlet of the microporous hollow fibers 12. In another embodiment, the evaporative cooling unit 10 may include an inlet and an outlet separate from the anchors 30.

As the liquid 52 is routed through the microporous hollow fibers 12 and the air flow 45 is passed through the evaporative cooling unit 10 (e.g., from the upstream space 48, through the first side 14 and the second side 18, into the internal cavity 46, through the third side 22 and the fourth side 26, and to the downstream space 50), the liquid 52 may be heated (or a portion thereof otherwise vaporized) and the air flow 45 may be cooled. Further, as previously described, the microporous hollow fibers 12 are configured to enable vapor formed from the liquid 52 to pass through pores in the walls of the microporous hollow fibers 12, such that the vapor comes into direct contact with the air flow 45, resulting in humidification of the air flow 45 and a transfer of mass and energy.

The above-described configurations of the evaporative cooling unit 10 in FIGS. 1 and 2 enable the air flow 45 to pass over the microporous hollow fibers 12 multiple times. For example, the closed-loop shape (e.g., rhombus shape) is configured to enable the air flow 45 to pass over multiple layers of the microporous hollow fibers 12 (e.g., at each side 14, 18, 22, 26 of the closed-loop shape), and through both the leading edge 31 and the trailing edge 38, thereby improving conditioning (e.g., cooling, humidifying) of the air flow 45 relative to traditional configurations. Further, the closed-loop shape (e.g., rhombus shape) may reduce a footprint or size of the evaporative cooling unit 10 relative to traditional configurations.

Figure 3:
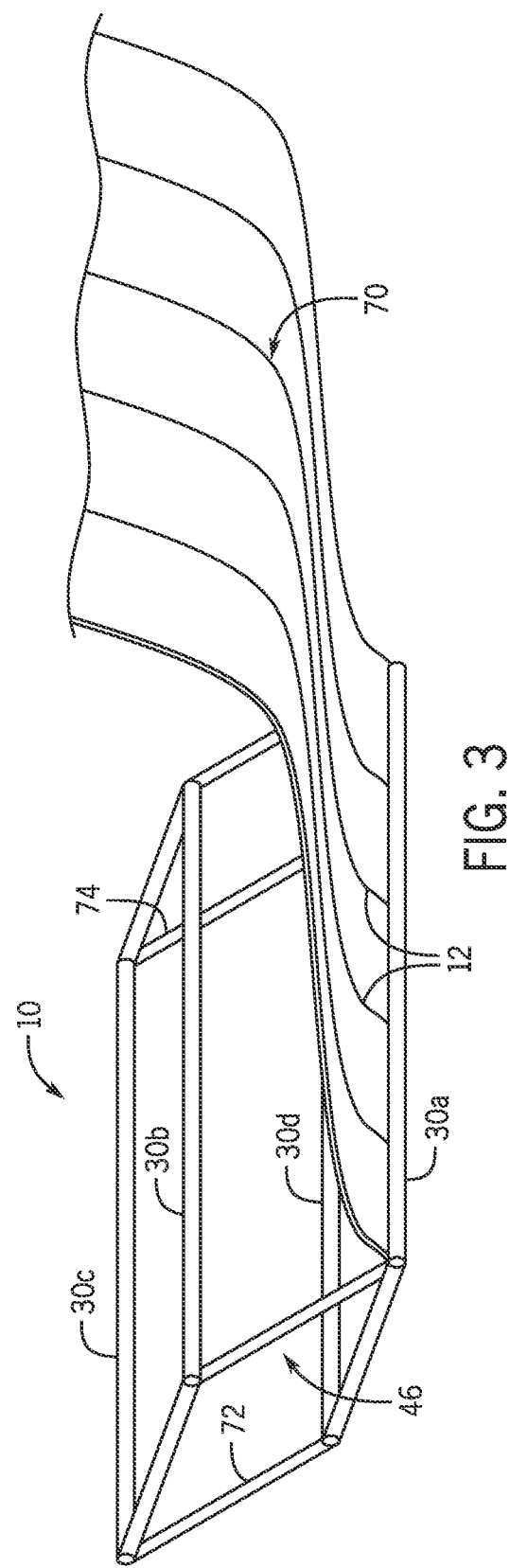
FIG. 3 is a schematic perspective view of a partially unassembled evaporative cooling unit, in accordance with an aspect of the present disclosure.

FIG. 3 is a schematic perspective view of an embodiment of a partially unassembled evaporative cooling unit 10. In the illustrated embodiment, the evaporative cooling unit includes a sheet 70 of the microporous hollow fibers 12. For example, as previously described, the sheet 70 may include a flexible material (e.g., a woven fabric) in which the microporous hollow fibers 12 are embedded, woven, or otherwise contained. The evaporative cooling unit 10 also includes four anchors 30 about which the sheet 70, when fully assembled, is wound (e.g., to form the winding 11 illustrated in FIGS. 1 and 2).

As shown, the sheet 70 may be attached a first anchor 30*a*. The sheet 70 may then be wound about the three other anchors 30*b*, 30*c*, 30*d*. In the illustrated embodiment, the anchors 30 are held in place by a first frame member 72 and a second frame member 74. However, the anchors 30 may be held in place relative to one another via different types of frames, frames located at different positions than the first frame member 72 and the second frame member 74 illustrated in FIG. 3, or both. As previously described, in some embodiments, the sheet 70 having the microporous hollow fibers 12 may be wound about the anchors 30 multiple times. For example, the sheet 70 may be attached to the first anchor 30*a*, wound about the second anchor 30*b*, the third anchor 30*c*, and the fourth anchor 30*d*, and then wound about the first anchor 30*a*, the second anchor, the third anchor 30*c*, and the fourth anchor 30*d* again. In some embodiments, the sheet 70 may be wound about the anchors 30 five times, ten times, fifteen times, or twenty or more times, depending on the preferred footprint and cooling capacity of the evaporative cooling unit 10. After the sheet 70 having the microporous hollow fibers 12 is wound about the anchors 30 (e.g., one or more times), the internal cavity 46 of the evaporative cooling unit 10 is formed inwards from the sheet 70.

Figure 4:
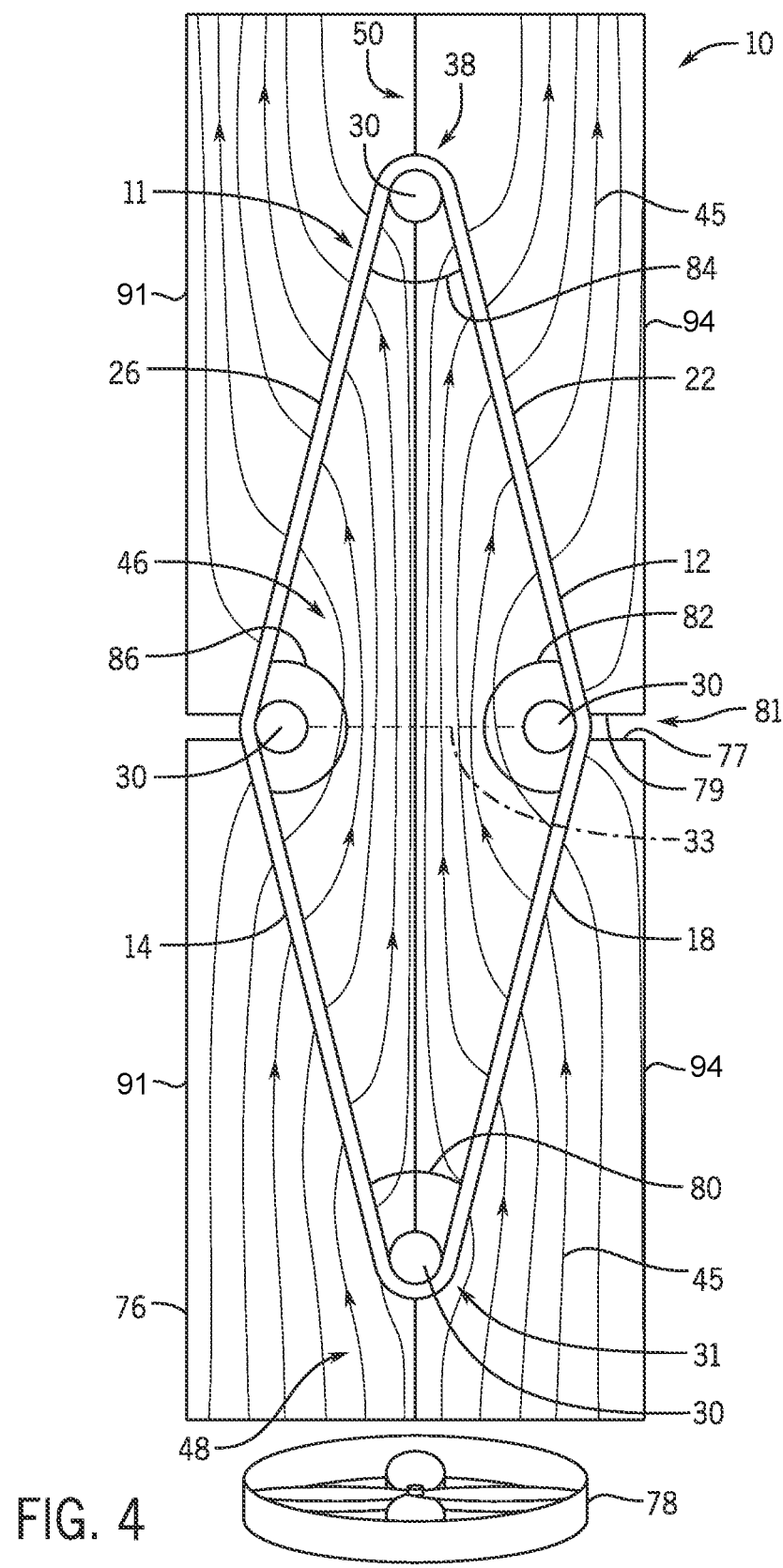
FIG. 4 is a schematic cross-sectional view of an evaporative cooling unit including microporous hollow fibers wound in a generally closed-loop shape (e.g., a rhombus), in accordance with an aspect of the present disclosure.

FIG. 4 is a schematic cross-sectional view of an embodiment of an evaporative cooling unit 10 including the winding 11 of microporous hollow fibers 12 forming a closed-loop shape (e.g., a rhombus). In FIG. 4, the evaporative cooling unit 10 is illustrated in operation. For example, the air flow 45 is directed from the upstream space 48, through the leading edge 31, into the internal cavity 46, through the trailing edge 38, and into the downstream space 50. The upstream space 48, the closed-loop shape (e.g., having the leading edge 31 and the trailing edge 38), and the downstream space 50 is contained within a flow channel 76 (e.g., a box, a conduit, etc.) of the evaporative cooling unit 10, where the flow channel 76 is configured to guide the air flow 45 from the downstream space 48, through the leading edge 31, into the internal cavity 46, though the trailing edge 38, and into the downstream space 50. The air flow 45 may be generated via a fan 78 (e.g., upstream of the flow channel 76 or within the flow channel 76). The flow channel 76 may include or be defined at least in part by a first side panel 91, second and third side panels (not shown in FIG. 4 due to the illustrated perspective, but included in and described in greater detail with respect to FIG. 6), a fourth side panel 94, a first wall 77 facing the upstream space and a second wall 79 facing the downstream space 50, where the first wall 77 and the second wall 79 operate to block the air flow 45 from bypassing the closed-loop space formed by the microporous hollow fibers 12. That is, the first wall 77 and the second wall 79 may extend from the fourth side panel 94 toward locations of the closed-loop shape adjacent to a juncture between the leading edge 31 and the trailing edge 38 of the closed-loop shape. A gap 81 outside of the flow channel 76 may extend between the first wall 77 and the second wall 79, where the gap 81 is fluidly isolated from the air flow 45.

As shown in FIG. 4, the air flow 45 may be substantially perpendicular to the first side 14 of the closed-loop shape as the air flow 45 traverses the first side 14. Likewise, the air flow 45 may be substantially perpendicular to the second side 18 of the closed-loop shape as the air flow 45 traverses the second side 18, substantially perpendicular to the third side 22 of the closed-loop shape as the air flow 45 traverses the third side 22, and substantially perpendicular to the fourth side 26 of the closed-loop shape as the air flow 45 traverses the fourth side 26. Liquid (not shown), such as liquid water, is routed through the microporous hollow fibers 12 such that, for example, a heat exchange relationship is generated between the liquid (not shown) and the airflow 45, as previously described. Accordingly, the flow of the liquid through the microporous hollow fibers 12 may be substantially perpendicular to the flow of the air flow 45 over the microporous hollow fibers 12.

In the illustrated embodiment, the first side 14 and the second side 18 of the closed-loop shape form a first angle 80, the second side 18 and the third side 22 of the closed-loop shape form a second angle 82, the third side 22 and the fourth side 26 of the closed-loop shape form a third angle 84, and the fourth side 26 and the first side 14 of the closed-loop shape form a fourth angle 86. The first angle 80 and the third angle 84 are acute, while the second angle 82 and the fourth angle 86 are obtuse. However, in another embodiment, the first angle 80 and the third angle 84 may be obtuse, while the second angle 82 and the fourth angle 86 may be acute. Further, in certain embodiments, the first angle 80, the second angle 82, the third angle 84, and the fourth angle 86 may be right angles. Further still, while the illustrated embodiment includes a rhombus shape, another embodiment may include a rhomboid shape.

Figure 5:
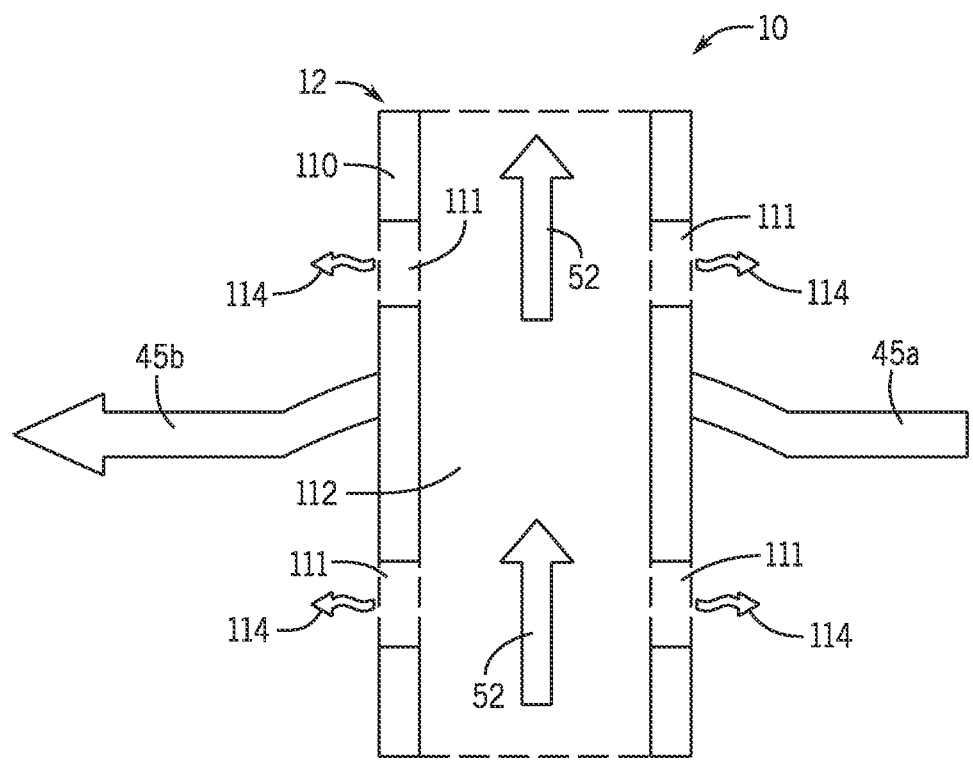
FIG. 5 is a magnified view that depicts the water and air membrane interface of a microporous hollow fiber that resides within an evaporative cooling unit, in accordance with an aspect of the present disclosure.

A magnified cross-section of a single microporous hollow fiber 12 is shown in FIG. 5. A flow of water 52 (in the liquid phase) moves through a microporous hollow fiber cavity 112 (or liquid flow path) and is contained within the volume enclosed by one or more walls 110 of the microporous hollow fiber 12. An unconditioned (or intake) air flow 45a is directed toward the microporous hollow fiber 12. When ambient conditions permit, liquid water vaporizes into the airstream (exterior to the microporous hollow fiber walls 110) by undergoing a phase change. Water vapor 114 exits the microporous hollow fiber cavity 112 (or liquid flow path) through a plurality of pores 111 and comes into direct contact with the ambient air. Water vapor mixes with the ambient air and adiabatically cools and/or humidifies the air stream. This results in a conditioned discharge airflow 45b.

Figure 6:
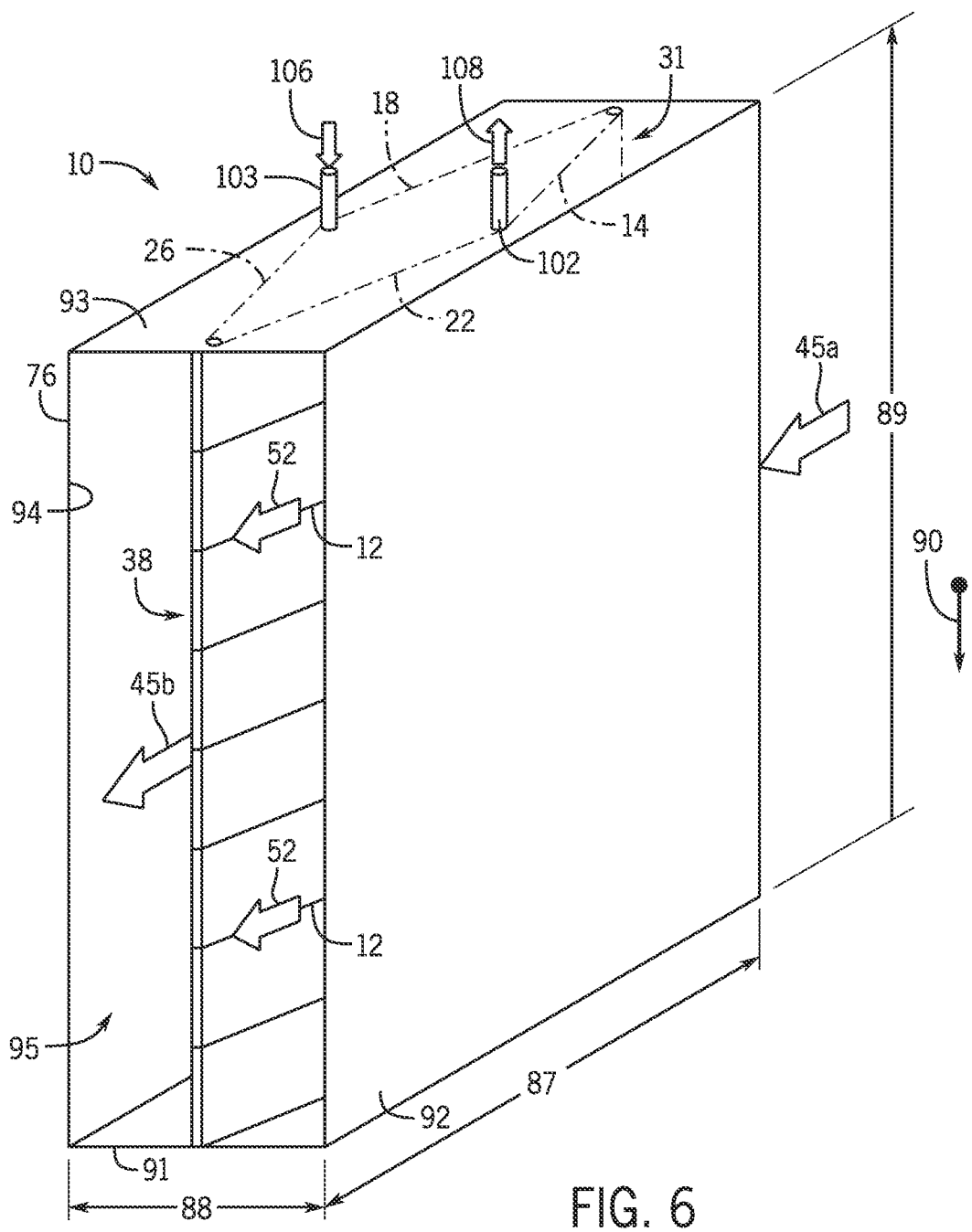
FIG. 6 is an isometric view of an evaporative cooling unit, which includes a frame, a water inlet port, and a water outlet port, in accordance with an aspect of the present disclosure.

FIG. 6 is an isometric view of an evaporative cooling unit 10, which includes a frame 76 (referred to in certain instances of the present disclosure as an air flow channel, a box, or a conduit) having a length 87, a width 88, and a height 89. In the illustrated embodiment, the width 88 is less than the length 87 and the height 89. Further, the length 87 and the height 89 are similarly sized (e.g., the height 89 is between 80% and 120% of the length 87). However, sizing of the frame 76 may vary depending on the embodiment. Further, it should be understood that "width," "length," and "height" do not necessarily denote an orientation of the evaporative cooling unit 10 (e.g., relative to a gravity vector 90). For example, in the illustrated embodiment, the height 89 runs parallel to the gravity vector 90. However, in another embodiment, the width 88 may run parallel to the gravity vector.

The evaporative cooling unit 10 in the illustrated embodiment includes a water outlet port 102, a water inlet port 103, and a plurality of microporous hollow fibers 12 that are supported by fabric weaves or other means. Air flow 45a depicts the unconditioned input air that enters the evaporative cooling unit 10, and air flow 45b depicts the conditioned discharge air that exits the evaporative cooling unit 10. Input or inlet water 106 enters the evaporative cooling unit 10 through the water inlet port 103, is distributed into the cavity of each individual microporous hollow fiber 12 (e.g., denoted by flow of water 52), and collectively discharges through the water outlet port 102. Outlet or output water 108 exits the water outlet port 102. That is, 106 depicts the water flow as it enters the water inlet port 103, 52 depicts the water flow as it travels through the plurality of microporous hollow fibers 12, and 108 depicts the water flow as it exits the water outlet port 102. Although FIG. 1 depicts one possible configuration where the water inlet port 103 and the water outlet port 102 are disposed on a common side of the evaporative cooling unit 10, the water inlet port 103 and water outlet port 102 may be disposed on different sides of the evaporative cooling unit 10 in another embodiment. Further, in certain embodiments, multiple instances of the water inlet port 103 may be included, and/or multiple instances of the water outlet port 102 may be included.

In the illustrated embodiment, the evaporative cooling unit 10 includes the trailing edge 38 through which the discharge (or conditioned) air flow 45b passes. The trailing edge 38 may include the third side 22 and the fourth side 26 of the closed-loop (e.g., rhombus) shape formed by the winding 11 of microporous hollow fibers 12 and fabric weaves (or other means) utilized to support the microporous hollow fibers 12, as previously described. An end of the evaporative cooling unit 10 is open adjacent to the trailing edge 38 to enable the discharge air flow 45b to be exhausted from the frame 101 and, thus, the evaporative cooling unit 10. That is, the illustrated frame 76 includes a first side panel 91 (e.g., lower side panel), a second side panel 92, a third side panel 93 (e.g., upper side panel), and a fourth side panel 94. The panels 91, 92, 93, 94 define an open end 95 of the evaporative cooling unit 10 adjacent to the trailing edge 38. The evaporative cooling unit 10 also includes a leading edge 31 configured to receive the incoming (or unconditioned) air flow 45a. The leading edge 31 may include the first side 14 and the second side 18 of the closed-loop (e.g., rhombus) shape formed by the plurality of microporous hollow fibers 12 and fabric weaves (or other means) utilized to support the microporous hollow fibers 12. The panels 91, 92, 93, 94 of the frame 76 define an open end 96 of the evaporative cooling unit 10 adjacent to the leading edge 31 to enable the incoming air flow 45a to pass into the frame 76 of the evaporative cooling unit 10. It should be noted that the illustrated evaporative cooling unit 10 is merely an example in accordance with the present disclosure, and that other features illustrated in FIG. 4 may be included in the embodiment illustrated in FIG. 6.

In general, the presently disclosed evaporative cooling unit 10 employs microporous hollow fibers 12 forming a closed-loop shape, such as a rhombus, configured to improve cooling of an air flow relative to traditional embodiments, and configured to reduce a footprint of the evaporative cooling unit 10 relative to traditional embodiments The present disclosure is not to be limited in scope by the specific embodiments described herein. Indeed, various modifications of the disclosure in addition to those described herein will become apparent to those skilled in the art from the foregoing description. Such modifications are intended to fall within the scope of the appended claims.

While only certain features and embodiments of the disclosure have been illustrated and described, many modifications and changes may occur to those skilled in the art, such as variations in sizes, dimensions, structures, shapes and proportions of the various elements, values of parameters including temperatures and pressures, mounting arrangements, use of materials, colors, orientations, etc., without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

All patents, applications, publications, test methods, literature, and other materials cited herein are hereby incorporated by reference.

The invention claimed is:

1. An evaporative cooling unit, comprising:
a first V-shaped portion of a winding of microporous hollow fibers configured to receive a liquid;
a second V-shaped portion of the winding of microporous hollow fibers configured to receive the liquid, wherein the second V-shaped portion is coupled with the first V-shaped portion;
an internal cavity disposed between the first V-shaped portion and the second V-shaped portion; and
a frame in which the winding of microporous hollow fibers is disposed, wherein the frame is configured to force an air flow through the winding of microporous hollow fibers by blocking the air flow from:
bypassing the winding of microporous hollow fibers between the winding of microporous hollow fibers and a first panel of the frame; and
bypassing the winding of microporous hollow fibers between the winding of microporous hollow fibers and a second panel of the frame, the second panel opposing the first panel; and
wherein the frame comprises:
a first wall extending from the first V-shaped portion of the winding of microporous hollow fibers to the first panel, wherein the first wall defines a portion of a boundary of an upstream space such that the first wall is configured to force the air flow from the upstream space, through the first V-shaped portion of the winding of microporous hollow fibers, and into the internal cavity; and
a second wall extending from the second V-shaped portion of the winding of microporous hollow fibers and the first panel, wherein the second wall defines a portion of an additional boundary of a downstream space configured to receive the air flow from the internal cavity and through the second V-shaped portion of the winding of microporous hollow fibers.

2. The evaporative cooling unit of claim 1, comprising a closed-loop shape formed by the first V-shaped portion and the second V-shaped portion, wherein the closed-loop shape comprises a rhombus.

3. The evaporative cooling unit of claim 1, comprising a sheet having the plurality of microporous hollow fibers contained therein, wherein the sheet comprises a woven fabric.

4. The evaporative cooling unit of claim 3, comprising a plurality of anchors about which the sheet is disposed to form the first V-shaped portion of the winding of microporous hollow fibers and the second V-shaped portion of the winding of microporous hollow fibers.

5. The evaporative cooling unit of claim 1, comprising:
at least one inlet configured to distribute the liquid into the microporous hollow fibers; and
at least one outlet configured to receive the liquid from the microporous hollow fibers.

6. The evaporative cooling unit of claim 1, wherein:
a first side of the first V-shaped portion and a second side of the first V-shaped portion form an angle;
the first side of the first V-shaped portion and a third side of the second V-shaped portion form an additional angle; and
the additional angle is greater than the angle.

7. An evaporative cooling unit, comprising:
a plurality of microporous hollow fibers, wherein each microporous hollow fiber of the plurality of microporous hollow fibers comprises:
one or more walls;
a liquid flow path defined by the one or more walls and configured to receive a liquid; and
a plurality of pores extending through the one or more walls, wherein the plurality of pores is configured to block passage of the liquid therethrough and enable passage of a vapor formed from the liquid therethrough;
a sheet having the plurality of microporous hollow fibers contained therein, wherein the sheet is arranged to form a closed-loop shape comprising a rhombus and defining an internal cavity; and
a frame in which the sheet is disposed, the frame having a first panel, a second panel opposing the first panel, a first wall extending from the first panel to an upstream side of the rhombus, and a second wall extending from the first panel to a downstream side of the rhombus, wherein the first wall defines a portion of a boundary of an upstream space such that the first wall is configured to force an air flow from the upstream space, through the upstream side of the rhombus, and into the internal cavity, and the second wall defines a portion of an additional boundary of a downstream space configured to receive the air flow from the internal cavity and through the downstream side of the rhombus.

8. The evaporative cooling unit of claim 7, comprising a plurality of anchors about which the sheet is arranged to form the closed-loop shape comprising the rhombus.

9. The evaporative cooling unit of claim 7, comprising:
at least one inlet configured to distribute the liquid into the plurality of microporous hollow fibers; and at least one outlet configured to receive the liquid from the plurality of microporous hollow fibers.

10. An evaporative cooling unit, comprising a winding of a plurality of microporous hollow fibers forming a closed-loop shape having a leading edge and a trailing edge configured to be disposed downstream of the leading edge relative to an air flow, wherein the closed-loop shape forms a boundary about an internal cavity disposed between the leading edge and the trailing edge, wherein a line of symmetry extending through the internal cavity defines a symmetry between the leading edge and the trailing edge, wherein the evaporative cooling unit comprises a frame in which the winding is disposed, the frame having a first panel, a second panel opposing the first panel, a first wall extending from the first panel to the leading edge, and a second wall extending from the first panel to the trailing edge, wherein the first wall defines a portion of a first additional boundary of an upstream space such that the first wall is configured to force the air flow from the upstream space, through the leading edge, and into the internal cavity, and wherein the second wall defines a portion of a second additional boundary of a downstream space configured to receive the air flow from the internal cavity and through the trailing edge of the closed-loop shape.

11. The evaporative cooling unit of claim 10, wherein the closed-loop shape comprises a rhombus.

12. The evaporative cooling unit of claim 10, comprising a sheet having the plurality of microporous hollow fibers contained therein.

13. The evaporative cooling unit of claim 12, wherein the sheet comprises a woven fabric.

14. The evaporative cooling unit of claim 12, comprising a plurality of anchors about which the sheet is disposed to form the winding of the plurality of microporous hollow fibers.

15. The evaporative cooling unit of claim 10, wherein the leading edge comprises a first arrow shape and the trailing edge comprises a second arrow shape, and the line of symmetry defines the symmetry between the first arrow shape and the second arrow shape.

* * * * *